United States Patent [19]

D'Alba

[11] 4,271,558
[45] Jun. 9, 1981

[54] WINDSHIELD WIPER BLADE REFILL ASSEMBLY AND ADAPTER CLIPS

[75] Inventor: Anthony R. D'Alba, Williamsville, N.Y.

[73] Assignee: Trico Products Corporation, Buffalo, N.Y.

[21] Appl. No.: 85,814

[22] Filed: Oct. 17, 1979

[51] Int. Cl.³ .............................................. B60S 1/02
[52] U.S. Cl. ................................................ 15/250.42
[58] Field of Search ......................... 15/250.36–250.42

[56] References Cited

U.S. PATENT DOCUMENTS

| 2,687,544 | 8/1954 | Scinta | 15/250.42 |
| 3,153,254 | 10/1964 | Lenz et al. | 15/250.42 |
| 3,707,741 | 1/1973 | Roberts | 15/250.42 |

FOREIGN PATENT DOCUMENTS 1957856  5/1971  Fed. Rep. of Germany ........ 15/250.42

Primary Examiner—Peter Feldman
Attorney, Agent, or Firm—E. Herbert Liss

[57] ABSTRACT

A wiper blade refill assembly for replacement in a wiper blade pressure distributing superstructure includes a combination of an elastomeric wiping element supported by an elongate backing element and a set of adapter clips having depending pairs of opposed adapter claws spaced apart a distance sufficient to slidably accommodate the backing element of the replacement refill unit. The adapter clips include a pair of spaced apart resilient arms having notches at their side edges in which the claws of the superstructure are seated and retained. The backing element is notched on a side edge to resiliently engage and retain an adapter claw.

10 Claims, 6 Drawing Figures

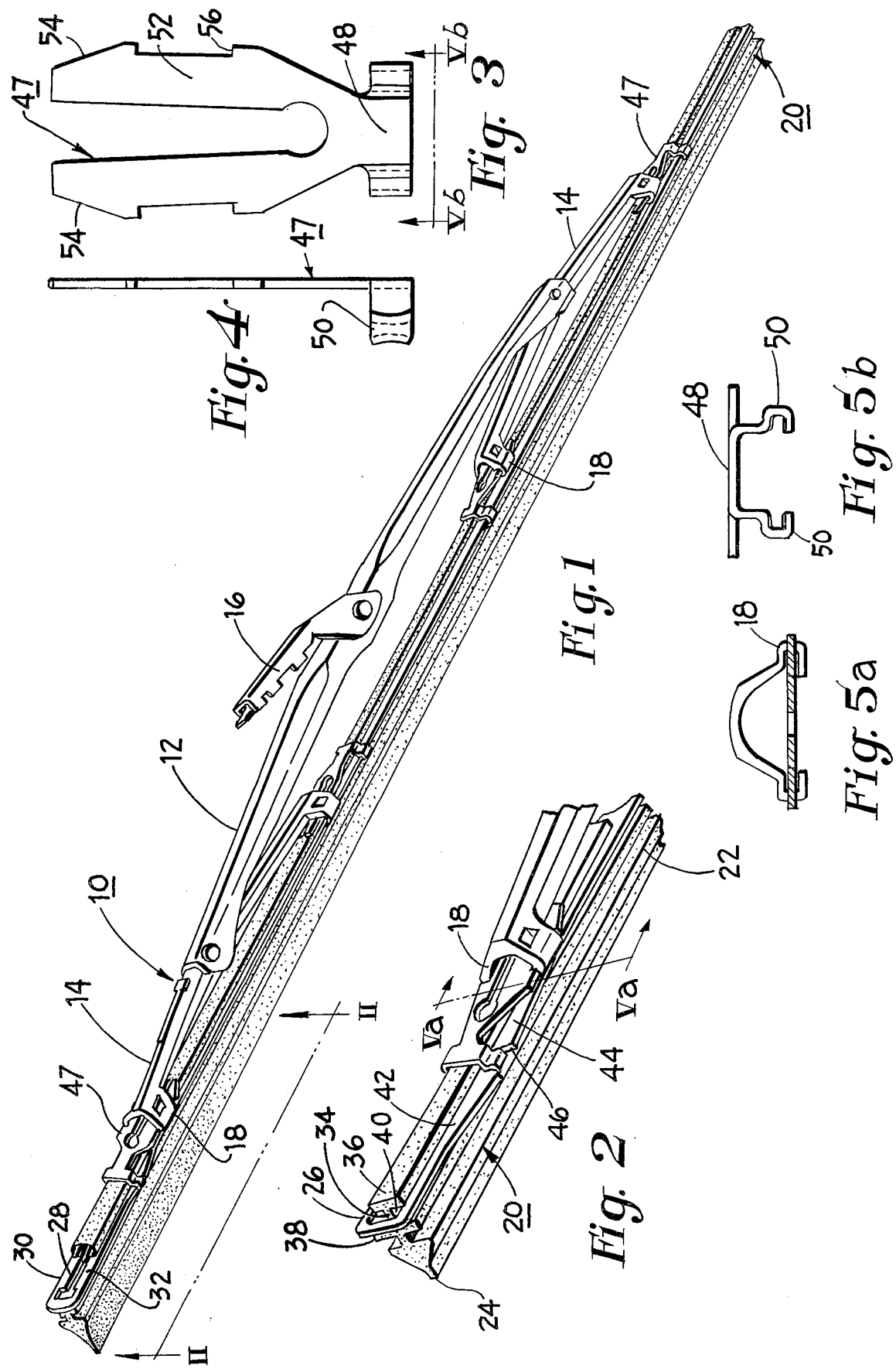

WINDSHIELD WIPER BLADE REFILL ASSEMBLY AND ADAPTER CLIPS

BACKGROUND OF THE INVENTION

The present invention relates to replacement refill units for wiper blades and more particularly to a wiper blade refill assembly comprising in combination a refill unit and a set of adapter clips for accomodating a refill unit to diverse superstructures.

Windshield wiper blades generally include flexible pressure distributing superstructures usually comprising a plurality of articulated levers pivotally connected together having longitudinally spaced aligned pairs of opposed blade straddling claws depending from the levers to slidably receive and retain a replaceable wiping assembly or refill unit, including an elastomeric squeegee element and backing element for supporting the squeegee element. The separations between the opposed blade straddling claws vary among superstructures of different sizes, different designs, and wiper blades made by different manufacturers, thus creating a problem in providing a suitable universal replacement wiper blade refill unit. This problem has been partially overcome for a limited range in the separation of the opposed blade straddling claws. For example, in U.S. Pat. No. 3,879,794 a reversible backing strip is disclosed which is adaptable to superstructures having opposed claws spaced apart two different widths. In U.S. Pat. No. 3,885,265 a refill unit is disclosed having a backing strip with its side rails attached to the squeegee carrying body by flexible leg portions so that the side rails can be compressed to accomodate a limited range of claw separation. In other attempts to overcome this problem refill units have been supplied with a sizing gauge and directions to spread or compress the blade straddling claws with the aid of the sizing gauge. Backing strips have been made in compromised widths to accomodate different superstructures. Thus, these are not wide enough to properly fit the wider claws and are so wide as to fit too snugly in the narrower claws.

SUMMARY OF THE INVENTION

According to the present invention the refill unit is an elongate element comprising an elastomeric squeegee having a wiping lip along one longitudinal edge and is usually supported adjacent its other longitudinal edge by a planar backing element of stiff, resilient material coextensive with the squeegee element. In the illustrated embodiment there is provided a central longitudinally extending slot in the backing element. On its longitudinal edge remote from the wiping lip the squeegee element includes a headed portion which is retained within the central slot. The backing element (often referred to as a backing strip) is similar to known backing strips and includes a portion adjacent one end which tapers outwardly to an increased lateral dimension, the taper terminating in a notch. An adapter clip is provided which includes a base portion, a pair of depending opposed adapter claws and a pair of forwardly extending spaced apart arms. The arms are tapered at their free ends and are notched intermediate their free ends and the base portion. The opposed adapter claws on the adapter clip are spaced apart a distance such that they slidably but positively retain the associated backing strip and yet do not cause binding. It is essential that the backing strip be free to slide in the claws for effective wiping of curved surfaces.

To replace a refill unit in a wiper blade the existing refill unit is removed. The adapter clips are secured to the superstructure as follows: The claw of the superstructure rides up the tapered free ends of the arms on the adapter clip until it is opposite the notch on the side edges of the arms, whereupon the resilience of the arms cause the claws to seat in the notches. Thus a set of adapter clips, one for each pair of claws of a superstructure, adapt the superstructure to accomodate the companion backing strip which is used in combination with the adapter clips to comprise a refill assembly. The resilient arms by which the adapter clips are secured to the claws of the superstructure permit accomodation of large variations in the spacing between opposed claws.

Therefore, it is the principal object of the present invention to provide a wiper blade refill assembly for windshield wiper blades which is universally adaptable to a wide range of opposed claw separations in wiper blade superstructures.

Another object of the invention is to provide an improved universal wiper blade refill assembly incorporating adapter clips which slidably retain the refill unit in a positive manner and securely retain the refill unit on the superstructure, accomodating the refill unit to a wide range of superstructure constructions.

Other objects and advantages of the invention will be apparent from the following detailed description taken in connection with the accompanying drawings.

BRIEF DESCRIPTION OF THE DRAWINGS

FIG. 1 is a perspective view of an assembled wiper blade superstructure and a wiper blade refill unit incorporating the invention;

FIG. 2 is an enlarged fragmentary perspective view illustrating a single adapter clip and refill unit in assembled condition;

FIG. 3 is a top elevation view of the adapter clip;

FIG. 4 is a side elevation view of the adapter clip shown in FIG. 3; and

FIGS. 5A and 5B are front elevational views of a pair of claws of the superstructure and the opposed adapter claws of the adapter clip, respectively, illustrating the differences in the separations of the opposed claws.

DETAILED DESCRIPTION

In FIG. 1 there is shown a wiper blade assembly 10 which includes a primary lever 12 and a pair of secondary levers 14 pivotally connected at their midportions to the primary lever 12 forming an articulated flexible pressure transmitting superstructure. Pivotally connected centrally to the lever 12 is a connector 16 for securing the wiper blade to a wiper arm. The levers 14 each have pairs of opposed blade straddling claws 18 at each end. The claws are substantially U-shaped in cross section.

A windshield wiper blade refill unit 20 comprises an elongate elastomeric squeegee element 22 having a relatively narrow wiping lip 24 along one longitudinal edge and a relatively wide planar backing element 26 of stiff, resilient material, as for example stainless steel, plastic or other suitable or desirable material, disposed along the opposite longitudinal edge. The backing strip illustrated by way of example is slotted centrally as at 28 forming side rails 30 and 32. A neck portion 34 of squeegee element 22 is received in the slot 28 and retained between headed portion 36 and shoulder portion 38 which form laterally sidewise opening slots 40 and neck portion 34. It will of course be understood that in accordance with the broader aspects of the invention other suitable and desirable types of backing elements may be employed as, for example, separate rails tied together by a clip or other suitable means at its ends. Adjacent one end of the backing strip 26 are tapered portions 42 and 44 which lead up to an enlarged lateral portion terminating in a notch 46 between the tapered portions.

Best shown in FIGS. 3 and 4, the adapter clip 47 comprises a base portion 48 having a depending pair of laterally spaced opposed claws 50 and forwardly extending arms 52. The arms 52 are tapered at their ends as at 54, terminating in a notch 56. The adapter clip is of stiff, resilient material and may be formed from a sheet of such material in a flat configuration by stamping the metal blank from suitable sheet metal and deforming portions of the blank downwardly and inwardly to form the claws 50.

To assemble the refill unit with the superstructure a set of adapter clips are used, one for each pair of claws 18. The claws 18 are slipped over the tapered ends 54 of the arms 52 and ride up the tapered ends 54 compressing the arms 52 together until the claws 18 are aligned with the notch 56 whereupon the resilience of the arms 52 effect seating of the claws 18 in the notches 56. Thereupon the end of the refill unit 20 remote from the tapered portions 42 and 44 is inserted between a pair of claws 50 by sliding the side edges of the backing strip through the claw 50; the sliding is continued through each successive claw 50 and is continued while the claws 50 of the end adapter clip at the left as seen in FIGS. 1 and 2 rides up the taper 44 until it is opposite the notch 46, whereupon the claw 50 seats in the notch 46 due to the resilience of the backing strip 26. The windshield wiper blade is now fully assembled and may be attached to a windshield wiper arm (not shown) by means of the arm connector 16.

The refill unit can be removed by compressing or twisting the side rails 30 and 32 in the region of the notch 46, whereupon the entire unit can be slipped out from the claws 50.

An improved wiper blade refill assembly comprising a refill unit and a set of adapter clips in combination have been provided which can accomodate various types and sizes of wiper blade superstructures. A windshield wiper blade refill assembly has been shown and described embodied in a specific wiper blade construction. It will be understood that in accordance with the broader aspects of the invention, other and different types of superstructures may be employed. There is provided a universal refill assembly which accomodates diverse types of superstructures having a wide range of claw widths.

Although a certain specific embodiment of the invention has been shown and described for the purposes of illustration it will be apparent that in accordance with the broader aspects of the invention various modifications and other embodiments are possible within the scope of the invention. For example, other and different types of latching arrangements for retaining the refill unit and the adapter clips may be employed. Other and different types of materials may be used either for the squeegee element, the backing strip or the adapter clips and other and different types of superstructures may be employed. Furthermore, other and different means may be employed to retain the squeegee element in assembly with the backing element. It is, therefore, to be understood that the invention is not limited to the specific arrangements shown but in its broadest aspects it includes all equivalent embodiments and modifications which come within the scope of the invention.

What is claimed is:

1. In a windshield wiper blade refill assembly including refill unit comprising an elongate elastomeric squeegee element having a relatively narrow wiping lip along one longitudinal edge and a relatively wide backing element of stiff resilient material adjacent the opposite longitudinal edge, the backing element being adapted to be slidably retained in a pressure-applying wiper blade superstructure having a set of depending longitudinally spaced aligned pairs of opposed claws and a set of adapter clips for fitting said refill unit to said superstructure, the improvement wherein each adapter clip of said set comprises a unitary, shaped piece of stiff, resilient sheet material formed to comprise a base portion having a pair of opposed adapter claws depending therefrom, said depending claws being spaced apart a distance sufficient to slidably receive opposite side edges of said backing element and a forwardly extending latching element for interlockingly engaging a pair of opposed claws on the superstructure and means for positively securing at least one of said clips and the backing element together.

2. A windshield wiper blade refill assembly according to claim 1 wherein said forwardly extending latching element comprises a pair of spaced apart resilient planar arms lying in a plane parallel to the backing element, at least one of said arms includes a shoulder for engaging a claw of said superstructure to retain said adapter clips on said superstructure.

3. A windshield wiper blade refill assembly according to claim 2 wherein the arms of the adapter clips are tapered at their free ends and notched on the outer side edges intermediate the free ends and the base whereby the claws of the superstructure will ride up the tapered ends to depress the arms toward each other until said claws line up with said notches whereupon the resilience of the arms will effect seating of the claws in the notches to thereby retain the adapter clip on the superstructure.

4. A windshield wiper blade refill assembly according to claim 1 wherein a portion of the backing element adjacent an end thereof tapers outwardly at a side edge to an enlarged width terminating in a notch whereby the adapter claw will ride up the taper until it lines up with the notch in the backing element whereupon the resilience of the backing element will effect seating of the adapter claw in the notch to provide means for positively securing the adapter clip and the backing element together.

5. In a windshield wiper blade refill assembly including a refill unit comprising an elongate elastomeric squeegee element having a relatively narrow wiping lip along one longitudinal edge and a relatively wide backing element of stiff resilient material along the opposite longitudinal edge, the backing element being adapted to be slidably retained in a pressure applying wiper blade superstructure having a set of depending longitudinally spaced, aligned pairs of opposed claws and a set of adapter clips for fitting said refill unit to said superstructure, the improvement wherein each clip of each of said set comprises a unitary shaped piece of resilient sheet material formed to comprise a base portion having a pair of laterally spaced, opposed adapter claws depending therefrom for slidably receiving side edges of said backing element, a portion of said backing element tapers outwardly at a side edge to an enlarged width terminating in a notch whereby the adapter claw will ride up the taper until it lines up with the notch whereupon the resilience of the backing element will effect seating of the adapter claw in the notch, a pair of spaced apart planar arms extending forwardly from said base lying in a plane parallel to said backing element, said arms being tapered at their free ends and notched on the outer side edges intermediate the free ends and the base whereby the claws of the superstructure will ride up the tapered ends to depress the arms toward each other until said claws line up with said notches whereupon the resilience of the arms will effect seating of the claws in the notches.

6. A windshield wiper blade refill assembly according to claim 5 wherein the opposed pair of adapter claws of the adapter clip are laterally spaced apart a distance different from the opposed pairs of claws of the superstructure.

7. A set of resilient adapter clips in combination with a windshield wiper blade refill unit for securement one to each of the opposed claw pairs of a wiper blade superstructure to enable the superstructure to accomodate a replaceable refill unit of a width different from the width of the refill unit to be replaced, said refill unit comprising an elongate elastomeric wiping element and an elongate planar backing element supporting said wiping element each of said clips being a unitary piece of resilient sheet material having a base portion, a pair of opposed adapter claws depending from said base portion spaced apart a distance sufficient to slidably engage the side edges of said backing element, a pair of laterally spaced apart resilient arms extending forwardly from said base portion and shoulder means on at least one of said arms for engaging a claw of said superstructure to retain said refill unit on said superstructure.

8. A set of resilient adapter clips according to claim 7 wherein the arms of each of the adapter clips are tapered at their free ends and notched on the outer side edges intermediate the free ends and the base whereby the claws of the superstructure will ride up the tapered ends to depress the arms toward each other until said claws line up with said notches whereupon the resilience of the arms will effect seating of the claws in the notches.

9. A set of resilient adapter clips according to claim 7 wherein a portion of the backing element adjacent an end thereof tapers outwardly at a side edge to an enlarged width terminating in a notch whereby the adapter claw will ride up the taper until it lines up with the notch in the backing element whereupon the resiliency of the backing element will effect seating of the claw in the notch.

10. A set of resilient adapter clips according to claim 7 wherein the opposed pairs of adapter claws of the adapter clip are laterally spaced apart a distance different from the opposed pairs of claws of the superstructure.

* * * * *